United States Patent [19]
Genoux

[11] Patent Number: 6,023,668
[45] Date of Patent: Feb. 8, 2000

[54] PROCESS AND DEVICE FOR DETERMINING THE FLIGHT CONFIGURATIONS OF AN AIRCRAFT

[75] Inventor: Gérard Charles Louis Genoux, Fuveau, France

[73] Assignee: Eurocopter France, Marignane Cedex, France

[21] Appl. No.: 08/765,794
[22] PCT Filed: May 10, 1996
[86] PCT No.: PCT/FR96/00705
  § 371 Date: Jan. 10, 1997
  § 102(e) Date: Jan. 10, 1997
[87] PCT Pub. No.: WO96/36910
  PCT Pub. Date: Nov. 21, 1996

[30] Foreign Application Priority Data

May 17, 1995 [FR] France .................................. 95 05840

[51] Int. Cl.⁷ .................................................. G06F 19/00
[52] U.S. Cl. .......................... 702/187; 702/144; 702/151; 702/169; 706/905; 706/913; 706/900; 701/4; 701/14; 701/15; 701/16; 244/17.13
[58] Field of Search ........................ 702/187, 33, 41–44, 702/56, 92–97, 103, 105, 113–115, 138, 140, 141, 144, 145, 147, 148, 130, 99, 150–153, 169, 175, 179, FOR 123, 182–185, FOR 124, FOR 126, FOR 134, FOR 135, FOR 139, FOR 142, FOR 144, FOR 145, FOR 150, FOR 151, FOR 152; 364/528.1, 528.15, 528.34, 528.4, 528.36–528.39; 706/1, 2, 4, 7, 8, 900, 905, 913; 244/17.13, 75 R, 76 R, 175, 177–188, 194, 195, 203, 227, 228; 701/3–5, 7, 8, 10, 11, 14–16; 73/178 H; 345/500.29

[56] References Cited

U.S. PATENT DOCUMENTS

| | | | |
|---|---|---|---|
| 5,299,759 | 4/1994 | Sherman et al. | 244/17.13 |
| 5,457,634 | 10/1995 | Chakravarty | 701/3 |
| 5,479,346 | 12/1995 | Lecomte et al. | 701/3 |

FOREIGN PATENT DOCUMENTS

WO 93/24873  12/1993  WIPO.

OTHER PUBLICATIONS

Stengel Robert F., "Toward Intelligent Flight Control" IEEE Transactions on Systems, Man, and Cybernetics, vol. 23, No. 6 Nov./Dec. 1993, pp. 1699–1717.

*Primary Examiner*—Hal Wachsman
*Attorney, Agent, or Firm*—Marshall, O'Toole, Gerstein, Murray & Borun

[57] ABSTRACT

A process and system for determining the flight configurations of an aircraft are disclosed. The process includes the steps of defining various possible flight configurations of the aircraft, determining a plurality of flight phases representative of the flight configurations, determining a plurality of characteristic parameters capable of being measured on the aircraft, measuring values of the characteristic parameters for each of the flight phases of the aircraft, calculating a fuzziness index for each of the flight configurations from the measured values of the characteristic parameters for the flight phases, the fuzziness index being representative of the flight configuration in a specified metric system, and defining an actual flight phase of the aircraft.

14 Claims, 1 Drawing Sheet

PROCESS AND DEVICE FOR DETERMINING THE FLIGHT CONFIGURATIONS OF AN AIRCRAFT

This is a continuation of International Application PCT/FR96/00705 with an international filing date of May 10, 1996, now abandoned.

BACKGROUND OF THE INVENTION

The present invention relates to a process for determining the flight configurations of an aircraft, especially a helicopter, as well as to a device for applying said process.

Within the framework of the present invention, flight configuration of an aircraft is understood to mean a flight phase, for example takeoff, landing or level flight, exhibiting determined flight characteristics, and capable of being differentiated from other flight phases, and during which the aircraft is subjected to relatively constant types of stresses.

It is often necessary to know the flight configurations of the aircraft, for example current flight configuration:
- either for the purpose of real-time monitoring of the aircraft;
- or for the purpose of maintenance, for example to determine whether a particular member has been subjected to high stresses requiring its replacement.

Various methods for determining the flight configurations of an aircraft are known.

Firstly, methods are known which apply neural networks which determine the flight configurations from measurements made in-flight and from stored predetermined coefficients. The phase of determining and storing these coefficients is lengthy and cumbersome. Moreover, once set up, these methods can be very difficult to modify, for example in order to be adapted to new knowledge or to technical modifications of the aircraft.

Secondly, a method is known which is based on artificial intelligence and which essentially uses empirical data. This method also requires lengthy application and does not allow all the possible flight configurations to be recognized.

A method may also be cited which is based on analyzing data, in particular specific flight parameters, which method does not however afford completely satisfactory accuracy.

SUMMARY OF THE INVENTION

The object of the present invention is to remedy these drawbacks. It relates to a process making it possible to determine, rapidly and accurately, the flight configurations of an aircraft, in particular a helicopter.

For this purpose, said process is noteworthy according to the invention:
in that, in a preliminary step:
- the various supposed possible flight configurations of said aircraft are defined;
- a plurality of flight phases representative of said flight configurations are determined;
- a plurality of characteristic parameters capable of being measured on the aircraft are determined;
- the values of said parameters are measured on said aircraft, for each of said flight phases; and
- for each of said flight configurations, a fuzziness index which is representative of the situation of said flight configuration in a specified metric system is calculated in said metric system, from said measured values of the parameters for the representative flight phases; and in that, for a flight phase of said aircraft to be defined:
- in the course of said flight phase, the values of said characteristic parameters are measured;
- the n flight configurations which are closest, from among said defined flight configurations, to said flight phase, n being a predefined integer, are determined in said metric system from said measured values;
- a membership function is determined for said flight phase in relation respectively to each of said n closest flight configurations; and the flight configuration of which said flight phase forms part, as appropriate, is deduced from the membership functions thus determined and from the fuzziness indices of these n closest flight configurations.

Thus, by virtue of the invention, the flight configurations of an aircraft can be determined quasi-continuously and accurately, by performing the essentials of the processing operations on a limited number n of predefined flight configurations.

Moreover, as will be seen later, the process according to the invention can be tailored during application, allowing in particular the integration of new undefined flight configurations in said preliminary step.

Advantageously, to calculate the fuzziness index of a flight configuration:
- the positions of the flight phases representative of said flight configuration are determined in said metric system from the measured values of said parameters;
- the center of gravity of the positions thus determined, corresponding to the center of gravity of said flight configuration, is calculated in said metric system from these positions;
- the distance between said center of gravity and the position of said flight phase is determined for each of said representative flight phases, in said metric system;
- the membership function in said flight configuration is determined, for each of said flight phases, from the corresponding distance thus determined; and
- said fuzziness index is calculated from the membership functions thus determined.

Furthermore, for a determined flight phase of distance $D(Xj,Ci)$ to the center of gravity of the corresponding flight configuration, the membership function $\mu(Xj)$ is advantageously defined by the relation:

$$\mu(Xj) = \exp(-D(Xj,Ci)),$$

whereas the fuzziness index $v(Ci)$ of a flight configuration is advantageously defined by the relation:

$$v(Ci) = M \cdot \sum_{j=1}^{j=L} S(\mu(Xj))$$

in which:
M is a predefined coefficient,
L is the number of relevant flight phases representative of said flight configuration,
$\mu(Xj)$ represents the membership function of a flight phase in said flight configuration, and
$S(x)$ is Shannon's entropy function, defined by:

$$S(x) = -x.\mathrm{Log}(x) - (1-x).\mathrm{Log}(1-x).$$

Moreover, to determine the n flight configurations closest to a flight phase:

the distance between said flight phase and the center of gravity of the relevant flight configuration is calculated in said metric system, for all the defined flight configurations;

the distances thus calculated are compared; and the n flight configurations with the smallest distances are picked.

In a first advantageous embodiment, the distance defined above between a flight phase and a flight configuration corresponds to the statistical distance of Mahalanobis in the corresponding metric system, whereas, in a second advantageous embodiment, said distance is calculated from the relation:

$$D(Xj, Ci) = \sqrt{(Xj - R)^t \cdot \sigma^{-1} \cdot (Xj - R)}$$

in which:

Xj is the position of said flight phase in said metric system,

R is the position of the center of gravity of said flight configuration in said metric system, t is a predefined coefficient, and σ represents the diagonal matrix of variances of said flight configuration.

Moreover, in a particularly advantageous embodiment of the invention, in order to deduce the flight configuration from the membership functions and from the fuzziness indices:

those among the n closest flight configurations are sought for which the membership function of the flight phase is greater than or equal to the product K.v(Ci), in which K represents a coefficient less than or equal to 1, preferably equal to 0.85, and v(Ci) is the calculated fuzziness index; and we deduce:

if a single flight configuration satisfies the above condition, that the flight phase forms part of this flight configuration;

if several flight configurations satisfy the above condition, that the flight phase forms part of the flight configuration for which the membership function is highest; and if no flight configuration satisfies the above condition, that said flight phase does not form part of any of said defined flight configurations.

This relates in particular to transition configurations (progressive changes in the flight conditions) and the one chosen corresponds to the impairment of the configuration whose membership function is highest.

Furthermore, advantageously, a flight phase which does not form part of any defined flight configuration is regarded as a new flight configuration used during subsequent applications of said process, this making it possible to tailor said process by integrating into it flight configurations not taken into account initially.

Preferably, at least some of the following flight phases of the aircraft are used as different flight configurations: takeoff, climb, holding level, banking, descent, approach and landing.

Additionally, at least some of the following parameters of the aircraft are used as characteristic parameters to be measured: load factor, speed, temperature, altitude, yaw sideslip, longitudinal attitude, lateral attitude, angular rate of yaw, flight controls, mass and yaw control.

To this list of characteristic parameters may advantageously be added, in the case of a helicopter, at least some of the following parameters: main rotor speed, rudder bar correction, main rotor power and tail rotor power of the helicopter.

The present invention also relates to a device for applying the aforesaid process.

According to the invention, said device is noteworthy in that it includes:

a first computer capable of calculating the fuzziness index of each of the defined flight configurations;

a second computer capable of calculating the membership functions of a flight phase to be defined in the n closest flight configurations; and a central computer linked to said first and second computers and capable of determining the flight configuration of which said flight phase to be defined forms part.

BRIEF DESCRIPTION OF THE DRAWINGS

The figures of the appended drawing will elucidate the manner in which the invention may be embodied. In these figures, identical references denote similar elements.

DETAILED DESCRIPTION OF THE PREFERRED EMBODIMENTS

Figure 1:
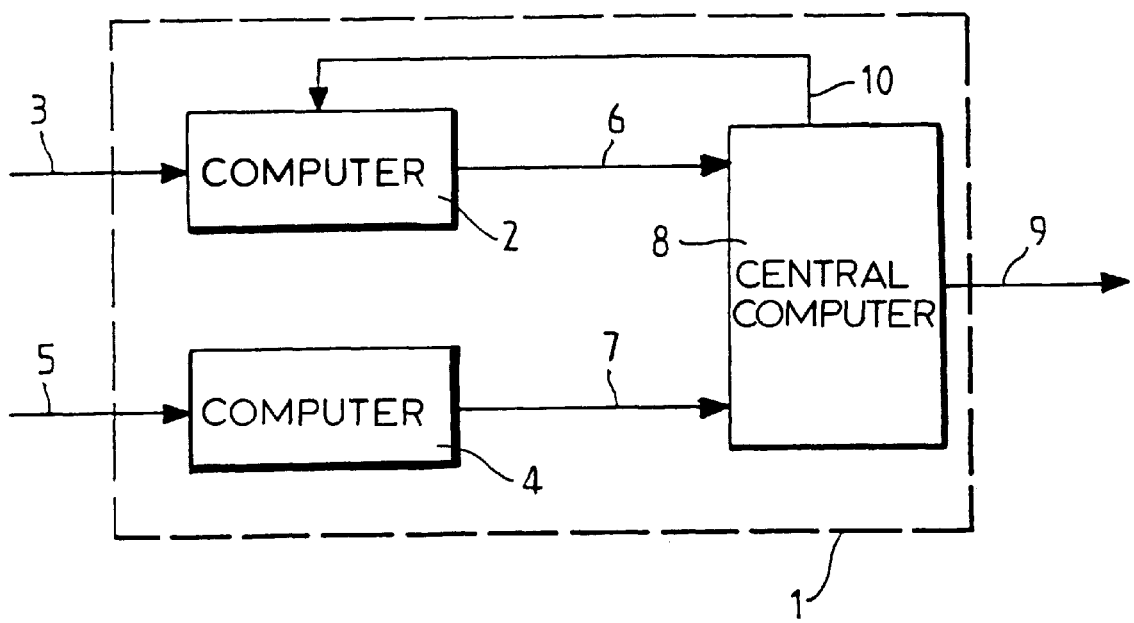
FIG. 1 is a schematic diagram of a device according to the invention.

The device 1 according to the invention and represented diagrammatically in FIG. 1 is intended to determine the flight configurations of an aircraft, in particular a helicopter.

A flight configuration of an aircraft corresponds to a flight phase exhibiting uniform flight characteristics and during which the aircraft is generally subjected to relatively constant types of stresses. Said aircraft may for example be taking off or climbing. A preferential choice of flight configurations will be specified below in an advantageous embodiment of the invention.

It is generally necessary to know the flight configurations of the aircraft, for example the current flight configuration:

in real time, in respect of the pilot or in respect of on-board devices, in particular for aircraft monitoring reasons; and/or on returning to the ground, in respect of devices or operators on the ground, in particular for aircraft verification and maintenance reasons.

The present invention relates to a process making it possible to determine rapidly and accurately the flight configurations of an aircraft. For this purpose, said process exhibits two steps, namely a first step (or preliminary step), making it possible to define various distinct and specific flight configurations and to associate characteristic recognition elements therewith, and a second step making it possible to associate a flight phase to be characterized with one of the flight configurations thus defined.

According to the invention, said first step of the process exhibits the following operations:

the various supposed possible flight configurations of said aircraft are defined;

a plurality of flight phases representative of said flight configurations are determined;

a plurality of characteristic parameters capable of being measured on the aircraft are determined;

the values of said parameters are measured on said aircraft, for each of said flight phases; and for each of said flight configurations, a fuzziness index which is representative of the situation of said flight configuration in a specified metric system is calculated in said determined metric system, from said measured values of the parameters for the representative flight phases, as specified below.

Preferably, according to the invention at least some of the following flight phases of the aircraft are used as different flight configurations: takeoff, climb, holding level, banking, descent, approach and landing. The configurations picked are those used for dimensioning the parts and designated by standard flight spectrum or reference spectrum.

Representative flight phases are therefore determined for each of these flight configurations. Thus, by way of example, in respect of takeoff, at least some of the following different flight phases may be chosen:

takeoffs in normal mode: in standard fashion, rightward, leftward, with side wind and/or head wind;

takeoffs at a maximum slope: again under various possible wind and direction of liftoff conditions; and takeoffs at a minimum slope.

The aircraft is then made to perform the chosen flight phases and the values of a plurality of predetermined parameters are measured on said aircraft in the course of executing these flight phases, these parameters preferably being at least some of the following: load factor, speed, temperature, altitude, yaw sideslip, longitudinal attitude, lateral attitude, angular rate of yaw, flight controls, mass and yaw control.

In the case of a helicopter, in addition to the above parameters, at least some of the following parameters may be used: main rotor speed, rudder bar correction, main rotor power and tail rotor power.

According to the invention, in order to determine the fuzziness index $v(Ci)$ of a flight configuration $Ci$, $i=1$ to $p$, $p$ being the number of different defined flight configurations, the following operations are performed in said metric system which is defined by m discriminant axes:

the center of gravity R of said flight configuration is calculated in said metric system from the relation:

$$R = \left(\sum_{j=1}^{j=L} Xj\right) / L$$

L being the number of representative flight phases associated with said flight configuration and in the course of which the measurements of said parameters have been made, and $Xj$ being the position in said metric system of one of said L flight phases, which position is determined from the measurements of said parameters;

for each of said relevant flight phases, the distance $D(Xj, Ci)$ between its position $Xj$ and said center of gravity R is calculated from the relation:

$$D(Xj, Ci) = \sqrt{(Xj - R)^t \cdot \sigma^{-1} \cdot (Xj - R)}$$

in which:
t is a predefined coefficient, and
σ represents the diagonal matrix of variances of the flight configuration Ci;

for each of said L relevant flight phases, a membership function $\mu(Xj)$ of said flight phase in said flight configuration Ci is calculated from the relation:

$$\mu(Xj) = \exp(-D(Xj, Ci))$$

the fuzziness index $v(Ci)$ is calculated from the membership functions of said L relevant flight phases, this index being defined by the relation:

$$v(Ci) = M \cdot \sum_{j=1}^{j=L} S(\mu(Xj))$$

in which:
M is a predefined coefficient, and
S(x) is a function which is known as Shannon's function and which is defined by:

$$S(x) = -x.\text{Log}(x) - (1-x).\text{Log}(1-x).$$

Figure 2:
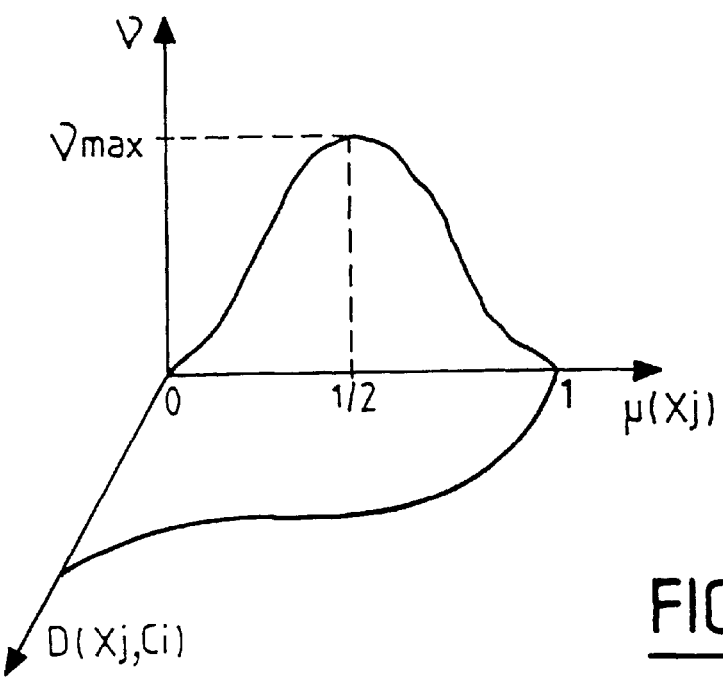
FIG. 2 illustrates, graphically, the relations between various values calculated during application of the invention.

As may be seen in FIG. 2, which illustrates the relations between some of the above terms:

the membership function $\mu(Xj)$ of a flight phase in a flight configuration lies between 0 and 1. For $\mu(Xj)=0$, said flight phase definitely does not form part of this flight configuration, whereas for $\mu(Xj)=1$ it definitely does form part thereof;

the fuzziness index v is zero when $\mu(Xj)$ is equal to 0 or 1, since there is then no uncertainty as regards membership, and it is a maximum (vmax) when $\mu(Xj)=½$ and when the uncertainty is highest;

the distance $D(Xj,Ci)$ between a flight phase and a flight configuration:
is zero, when said flight phase forms part of this flight configuration ($\mu(Xj)=1$); and
is a maximum when said flight phase does not form part of this flight configuration ($\mu(Xj)=0$).

This first step of the process according to the invention, as described above, is applied via a computer 2 of the device 1 which receives by way of a link 3 the measurements of the characteristic parameters, made in the course of said flight phases. Said link 3 is connected for this purpose:

either simultaneously to various measurement devices (not represented) making said measurements, or to a centralized system (not represented) collating said measurements.

The second step of the process according to the invention is now described, said second step making it possible to determine to which of said flight configurations defined above a flight phase to be defined belongs.

For this purpose, according to the invention:

in the course of said flight phase to be defined, the values of said characteristic parameters are measured;

the n flight configurations which are closest, from among said previously defined flight configurations, to said flight phase are determined in said metric system from said measured values, n being a predefined integer which is preferably equal to the number of degrees of freedom of said metric system, that is to say to the number of discriminant axes of said metric system, namely m in the present example;

for these n flight configurations, the corresponding membership function is determined for said flight phase, as defined earlier; and the flight configuration of which said flight phase forms part is determined, as appropriate, from said determined membership functions and from the fuzziness indices of said n flight configurations.

In order to determine the n closest flight configurations:

for each of the defined flight configurations, the distance between the center of gravity of said flight configuration and the position of said flight phase, determined from the measurements of said characteristic parameters, is calculated in said metric system. This distance calculation is performed using either the statistical distance of Mahalanobis or the distance $D(X_j, C_i)$ defined earlier;

the distances thus calculated are compared; and the n flight configurations with the smallest distances are selected.

The above operations are performed by a computer 4 of the device 1 according to the invention, which receives the measurements of the characteristic parameters by way of a link 5 and which transmits the results by way of a link 7 to a central computer 8, said central computer 8 furthermore receiving, by way of a link 6, the results of the above-described processing operations of the computer 2.

Said central computer 8 then searches from among said n closest flight configurations for those for which the membership function received from the computer 4 is greater than or equal to the product $K.v(C_i)$, in which K represents a coefficient less than or equal to 1 and $v(C_i)$ is the fuzziness index calculated and transmitted y the computer 2, and from this it deduces:

if a single flight configuration satisfies the above condition, that the flight phase forms part of this flight configuration;

if several flight configurations satisfy the above condition, that the flight phase forms part of the flight configuration for which the membership function is highest; and if no configuration satisfies the above condition, that said flight phase does not form part of any of the flight configurations defined in the first step of the process according to the invention.

In this latter case, it is concluded that:

either an error has appeared in the application of the invention, for example a measurement error, or said flight phase forms part of a new flight configuration, different from the predefined flight configurations.

It will be noted that within the framework of the invention the coefficient K is preferably chosen equal to 0.85.

The device 1 can transmit the results obtained by way of a link 9 to user devices (not represented), for example a display device or a storage memory.

The present invention described above includes numerous advantages. It is in particular accurate and its application very rapid.

In addition, the device 1 makes it possible to refine and augment the process according to the invention in a twofold manner, such as specified below, by way of a link 10 making it possible to transmit data from the central computer 8 to the computer 2.

Thus, on the one hand, when a flight phase is classed in the manner described above into a determined flight configuration, said central computer 8 can transmit the characteristics of said flight phase to said computer 2 which then associates this flight phase with said flight configuration. This association supposes that the computer 2 determines the new center of gravity and the new fuzziness index of this flight configuration, this making it possible to refine these values which are later used during subsequent applications of the process according to the invention.

This operation of taking into account a flight phase can be carried out either indefinitely or until the number of flight phases associated with a flight configuration is equal to a determined value.

On the other hand, in the case in which the central computer 8 concludes that a determined flight phase does not form part of any defined flight configuration, it transmits, in a particularly advantageous embodiment of the invention, the characteristics of this flight phase to the computer 2 which regards it as a new flight configuration. This makes it possible to augment the process according to the invention with flight configurations which have not been defined in the first step of said process. Thus, the invention can be tailored as it is applied.

According to the invention, the device 1 can be used in various ways.

Thus, in a first embodiment, said device 1 is stowed entirely on board the aircraft, this making it possible to obtain the results described above in real time, these results then being transmitted to the pilot or to devices, for example monitoring devices, of said aircraft.

In a second embodiment, also making it possible to obtain the results in real time, only the computer 4 and the central computer 8 of said device 1 are stowed on board, while the computer 2 performs its operations on the ground, the results from which are recorded in a memory (not represented) which is also stowed on board and which is connected to the central computer 8 which can consult it.

Finally, in a third embodiment, said device 1 remains on the ground, while stowed on board the aircraft is a memory (not represented) which is connected to the various devices for measuring said characteristic parameters and which records the measurements made. The recorded results are transmitted at the end of the aircraft's mission to the device 1 which then carries out the processing operations on the ground. Recording may for example be performed on a rigid medium, in particular a diskette, which can be used by said device 1.

These various embodiments clearly demonstrate the numerous advantages of the present invention.

I claim:

1. A process for determining the flight configurations of an aircraft, comprising the steps of:

defining a plurality of flight configurations of the aircraft;

determining a plurality of flight phases representative of each of said flight configurations;

determining a plurality of characteristic parameters capable of being measured on the aircraft;

measuring values of said characteristic parameters for each of said flight phases of the aircraft;

calculating a fuzziness index for each of said flight configurations from said measured values of said characteristic parameters for said flight phases, each of said fuzziness indices being representative of one of said flight configurations in a metric system; and defining an actual flight phase of said aircraft including the steps of:

measuring values of said characteristic parameters during said actual flight phase;

determining in said metric system a predefined integer number n of flight configurations from among said defined flight configurations which are closest to said actual flight phase based on said measured values;

determining a membership function for said actual flight phase in relation to each of said n closest flight configurations; and deducing a flight configuration corresponding to said actual flight phase from said membership functions and from said fuzziness indices of said n closest flight configurations.

2. The process as claimed in claim 1, wherein said calculating step comprises the steps of:
   determining a plurality of positions of flight phases representative of said n flight configurations in said metric system from said measured values of said characteristic parameters;
   determining in said metric system a center of gravity for each of said determined positions that corresponds to the center of gravity of said n flight configurations;
   determining in said metric system, for each of said representative flight phases, a distance between each of said centers of gravity and a position of each said representative flight phase;
   determining said membership function in said n flight configurations for each of said representative flight phases from said determined distance; and
   calculating said fuzziness index from said membership function.

3. The process as claimed in claim 2, wherein said distances are calculated from the relation:

$$D(Xj, Ci) = \sqrt{(Xj - R)^t \cdot \sigma^{-1} \cdot (Xj - R)}$$

in which:
   Xj is the position of a flight phase in said metric system,
   R is the position of the center of gravity of a flight configuration in said metric system,
   t is a predefined coefficient, and
   σ represents the diagonal matrix of variances of said flight configuration.

4. The process as claimed in claim 1, wherein Xj is the position of a flight phase in said metric system, wherein Ci is one of said flight configurations, and wherein for a determined flight phase of distance D (Xj, Ci) to the center of gravity of the corresponding flight configuration, the membership function $\mu(Xj)$ is defined by the relation:

$$\mu(iXj) = \exp(-D(Xj, Ci)).$$

5. The process as claimed in claim 4, wherein a fuzziness index v(Ci) of a flight configuration is defined by the relation:

$$v(Ci) = M \cdot \sum_{j=1}^{j=L} S(\mu(Xj))$$

in which:
   Xj is the position of a flight phase in said metric system,
   M is a predefined coefficient,
   L is the number of flight phases representative of said flight configuration,
   $\mu(Xj)$ represents the membership function of a flight phase in said flight configuration, and
   S(x) is Shannon's entropy function, defined by:

$$S(x) = -x.\text{Log}(x) - (1-x).\text{Log}(1-x).$$

6. The process as claimed in claim 1, wherein the step of determining the n flight configurations closest to a flight phase comprises the steps of:
   for each one of said defined flight configurations, calculating in said metric system a distance between a flight phase and the center of gravity of said one flight configuration;
   comparing said distances thus calculated; and
   picking the n flight configurations with the smallest distances.

7. The process as claimed in claim 6, wherein said distances are calculated from the statistical distance of Mahalanobis in the corresponding metric system.

8. The process as claimed in claim 1 wherein said deducing step comprises the step of determining which of the n closest flight configurations satisfy a condition in which the membership function of the flight phase is greater than or equal to the product K.v(Ci), in which K represents a coefficient less than or equal to 1 and v(Ci) is the calculated fuzziness index and wherein:
   if a single flight configuration satisfies said condition, that the flight phase forms part of said single flight configuration;
   if several flight configurations satisfy said condition, that the flight phase forms part of the flight configuration for which the membership function is highest; and
   if no flight configuration satisfies said condition, that said flight phase does not form part of any of said defined flight configurations.

9. The process as claimed in claim 8, wherein the coefficient K is equal to 0.85.

10. The process as claimed in claim 8, wherein a flight phase which does not form part of any defined flight configuration is regarded as a new flight configuration used during subsequent applications of said process.

11. The process as claimed in claim 1 wherein at least some of the following flight phases of the aircraft are used as different flight configurations: takeoff, climb, holding level, banking, descent, approach and landing.

12. The process as claimed claim 1 wherein at least some of the following parameters of the aircraft are used as characteristic parameters to be measured: load factor, speed, temperature, altitude, yaw sideslip, longitudinal attitude, lateral attitude, angular rate of yaw, flight controls, mass and yaw control.

13. The process as claimed in claim 1, wherein said aircraft is a helicopter and wherein at least some of the following parameters of the helicopter are used as characteristic parameters to be measured: main rotor speed, rudder bar correction, main rotor power and tail rotor power.

14. The process as claimed in claim 1 wherein a first computer calculates said fuzziness index, wherein a second computer calculates said membership functions, and wherein a central computer linked to said first and second computers determines said flight configuration.

* * * * *